US012747095B2

(12) United States Patent
Qiu

(10) Patent No.: US 12,747,095 B2
(45) Date of Patent: Sep. 29, 2026

(54) GARBAGE BAG STORAGE BOX

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 0 days.

(21) Appl. No.: 18/945,510

(22) Filed: Nov. 12, 2024

(65) Prior Publication Data

US 2026/0062206 A1 Mar. 5, 2026

(30) Foreign Application Priority Data

Aug. 27, 2024 (CN) ........................ 202422087819.8

(51) Int. Cl.
*B65F 1/06* (2006.01)
*B65F 1/14* (2006.01)

(52) U.S. Cl.
CPC ............ *B65F 1/062* (2013.01); *B65F 1/1426* (2013.01)

(58) Field of Classification Search
CPC ...... B65F 1/062; B65F 1/0006; B65F 1/1426; B65B 67/1277
See application file for complete search history.

(56) References Cited

U.S. PATENT DOCUMENTS

| | | | | |
|---|---|---|---|---|
| 10,053,282 | B2 * | 8/2018 | Dunn | B65F 1/062 |
| 2007/0157582 | A1 * | 7/2007 | Chomik | B65F 1/062 53/576 |
| 2014/0110293 | A1 * | 4/2014 | Dunn | B65F 1/0006 206/389 |
| 2018/0362250 | A1 * | 12/2018 | Morand | B65F 1/06 |
| 2022/0388767 | A1 * | 12/2022 | Dunn | B65F 1/062 |
| 2023/0339676 | A1 * | 10/2023 | Rontree | B65F 1/1426 |
| 2024/0002145 | A1 * | 1/2024 | Johnson | B65F 1/0006 |
| 2024/0208721 | A1 * | 6/2024 | Morand | B65F 1/062 |
| 2025/0066116 | A1 * | 2/2025 | Johnson | B65F 1/1607 |

* cited by examiner

*Primary Examiner* — Shawn M Braden
(74) *Attorney, Agent, or Firm* — Bayramoglu Law Offices LLC

(57) ABSTRACT

A garbage bag storage box is provided. The garbage bag storage box includes an annular container and a protruding element. A central opening is defined by the annular container. The annular container includes a storage area. The protruding element surrounds an outer peripheral surface of the annular container. The protruding element radially protrudes outward from the outer peripheral surface of the annular container and has a uniform or even width. The protruding element includes a first protruding edge surrounding the outer peripheral surface of the annular container and a second protruding edge surrounding an outer periphery of the first protruding edge. A contour of the central opening has a diameter dimension in a radial plane. The central opening is defined to be circular with the diameter dimension in the radial plane.

10 Claims, 6 Drawing Sheets

GARBAGE BAG STORAGE BOX

CROSS REFERENCE TO THE RELATED APPLICATIONS

This application is based upon and claims priority to Chinese Patent Application No. 202422087819.8, filed on Aug. 27, 2024, the entire contents of which are incorporated herein by reference.

TECHNICAL FIELD

The present disclosure relates to the technical field of garbage bag storage boxes, and specifically to a garbage bag storage box.

BACKGROUND

A garbage bag storage box is a special box used in a garbage container. A continuous garbage bag without preset breakpoints is placed in the garbage bag storage box, and the length of the garbage bag to be used can be determined according to an actual amount of garbage, to adapt to different amounts of garbage and reduce the inconvenience caused by an insufficient or excessive length of the garbage bag.

Generally, the storage box is disposable, and can be replaced as a whole after the garbage bag is used up. Lugs are provided at intervals on a peripheral side of the storage box. The storage box is hung in the garbage container through the lugs. During use, the lugs are likely to crack or break.

SUMMARY

An objective of the present disclosure is to provide a garbage bag storage box to solve the above problems of the prior art.

A garbage bag storage box is provided. The garbage bag storage box includes an annular container and a protruding element. A central opening is defined by the annular container. The annular container includes a storage area. The protruding element surrounds an outer peripheral surface of the annular container. The protruding element radially protrudes outward from the outer peripheral surface of the annular container and has a uniform or even width. The protruding element includes a first protruding edge surrounding the outer peripheral surface of the annular container and a second protruding edge surrounding an outer periphery of the first protruding edge. A contour of the central opening has a diameter dimension in a radial plane. The central opening is defined to be circular with the diameter dimension in the radial plane.

In an embodiment, the first protruding edge is arranged perpendicular to the second protruding edge.

In an embodiment, at least two holes are provided at intervals on the first protruding edge.

In an embodiment, a reinforcing plate is arranged between the first protruding edge and the second protruding edge.

In an embodiment, the annular container includes an outer wall, an inner wall, and a bottom wall connected between the outer wall and the inner wall, and the storage area is located between the outer wall and the inner wall.

In an embodiment, the central opening is defined by an inner surface of the inner wall.

In an embodiment, the bottom wall is of a planar shape.

In an embodiment, the garbage bag storage box further includes an annular cover attached to the storage area.

In an embodiment, the annular cover includes an outer edge at an outer periphery of the annular cover, and the outer edge extends outward and is configured to engage with the protruding element.

In an embodiment, the annular cover includes an inner edge at an inner periphery of the annular cover, and the inner edge extends downward and is configured to engage with an upper portion of an inner wall of the annular container; and a locking portion is arranged on a side of the inner edge opposite to the inner wall, and the locking portion is configured to lock the annular cover in the storage area.

In an embodiment, the locking portion includes a protrusion attached to the side of the inner edge opposite to the inner wall, and the protrusion is configured to snap-fit to the upper portion of the inner wall of the annular container.

In an embodiment, the annular cover includes at least two tearable portions, and after the at least two tearable portions are torn off, a gap is left on the annular cover.

In an embodiment, the at least two tearable portions respectively include protruding blocks extending outward.

In an embodiment, grooves respectively configured to receive the protruding blocks are provided on the annular cover.

In conclusion, the present disclosure has the following advantages.

1. In the garbage bag storage box of the present disclosure, because the protruding element is configured as a complete ring surrounding an outer periphery of the annular container and having a uniform or even width, the protruding element does not easily break.

2. In the garbage bag storage box of the present disclosure, when the first protruding edge of the protruding element is arranged perpendicular to the second protruding edge of the protruding element, the protruding element can be fitted in a garbage container by engaging, so that the annular container can be kept stable in the garbage container.

3. In the garbage bag storage box of the present disclosure, at least two holes are provided at intervals on the first protruding edge of the protruding element, and the annular container is further kept stable in the garbage container through engagement of the holes with components in the garbage container.

4. In the garbage bag storage box of the present disclosure, the annular cover can protect a garbage bag in the storage area to prevent the garbage bag from being messed up or falling due to improper operation by the user.

5. In the garbage bag storage box of the present disclosure, after the two tearable portions are torn off, a gap is left on the annular cover to allow the garbage bag to pass through. Therefore, the garbage bag storage box is easy to use.

6. In the garbage bag storage box of the present disclosure, the configuration of the at least two tearable portions makes it easier to completely tear off the tearable portions, without causing the tearable portions to break or tear sideways.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF THE EMBODIMENTS

In the following description, numerous specific details are given to provide a more thorough understanding of the present disclosure. However, it will be apparent to those skilled in the art that the present disclosure can be practiced without one or more of these details. In some other examples, to avoid confusion with the present disclosure, some technical features well known in the art are not described.

Embodiment 1

Figure 1:
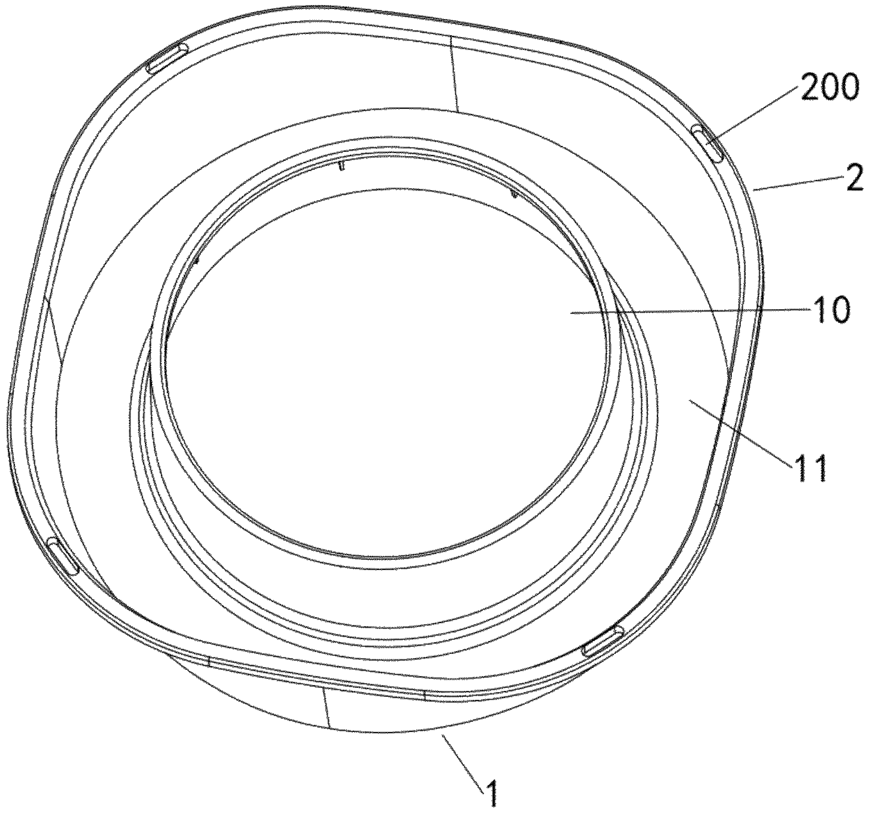
FIG. 1 is a schematic diagram of a garbage bag storage box according to an embodiment.
Figure 2:
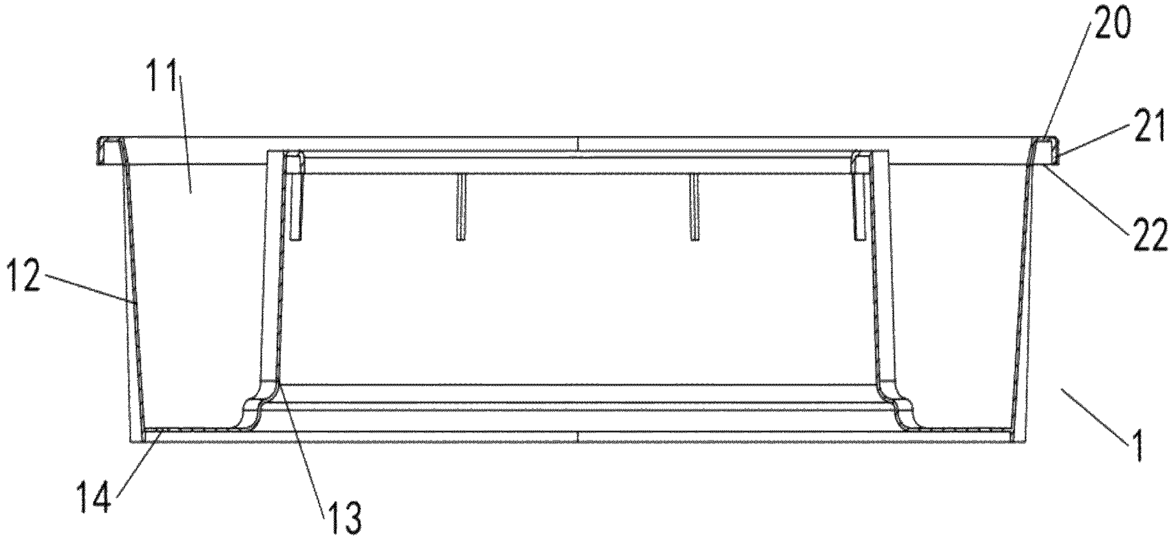
FIG. 2 is a cross-sectional view of the garbage bag storage box of the embodiment shown in FIG. 1.

As shown in FIG. 1 and FIG. 2, this embodiment discloses a garbage bag storage box, including an annular container 1 and a protruding element 2. A central opening 10 is defined by the annular container 1. The annular container 1 includes a storage area 11. The protruding element 2 surrounds an outer peripheral surface of the annular container 1. The protruding element 2 radially protrudes outward from the outer peripheral surface of the annular container 1 and has a uniform or even width. The protruding element 2 includes a first protruding edge 20 surrounding the outer peripheral surface of the annular container 1 and a second protruding edge 21 surrounding an outer periphery of the first protruding edge 20. A contour of the central opening 10 has a diameter dimension in a radial plane. The central opening 10 is defined to be circular with the diameter dimension in the radial plane. Because the protruding element 2 is configured as a complete ring surrounding an outer periphery of the annular container 1 and having a uniform or even width, the protruding element 2 does not easily break.

As shown in FIG. 2, the first protruding edge 20 of the protruding element is arranged perpendicular to the second protruding edge 21 of the protruding element. As such, the protruding element 2 can be fitted in a garbage container by engaging, so that the annular container 1 can be kept stable in the garbage container.

As shown in FIG. 1, four holes 200 are provided at intervals on the first protruding edge 20, and the annular container 1 is kept stable in the garbage container through engagement of the holes 200 with components in the garbage container.

As shown in FIG. 2, a reinforcing plate 22 is arranged between the first protruding edge 20 and the second protruding edge 21 to increase the mechanical strength of the protruding element 2.

As shown in FIG. 2, the annular container 1 includes an outer wall 12, an inner wall 13, and a bottom wall 14 connected between the outer wall 12 and the inner wall 13, and the storage area 11 is located between the outer wall 12 and the inner wall 13.

As shown in FIG. 2, the central opening 10 is defined by an inner surface of the inner wall 13.

As shown in FIG. 2, the bottom wall 14 is of a planar shape.

Embodiment 2

Figure 3:
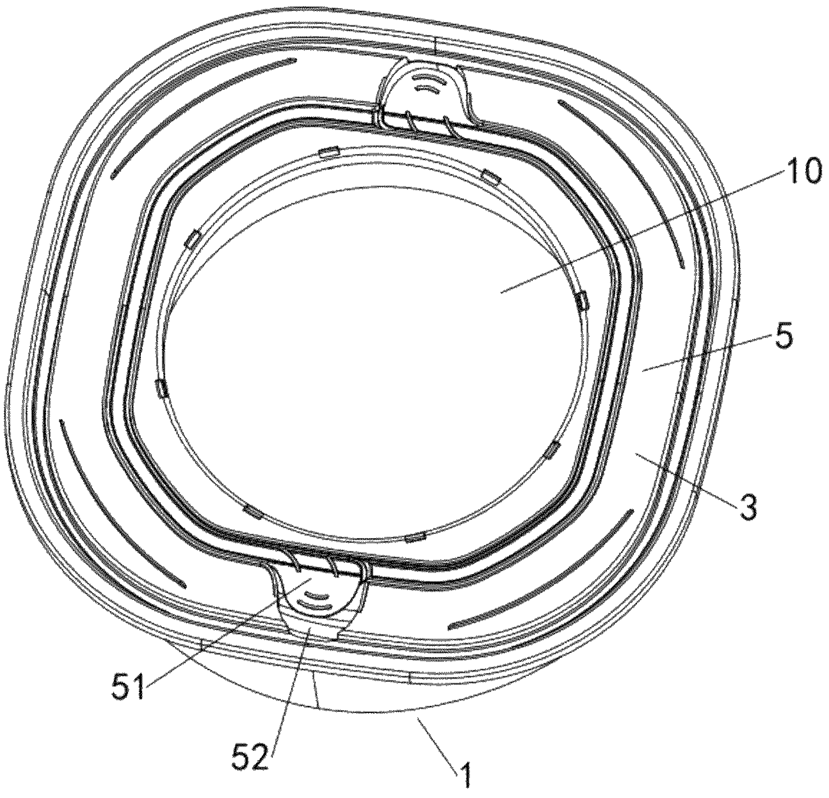
FIG. 3 is a schematic diagram of a garbage bag storage box according to an embodiment.
Figure 4:
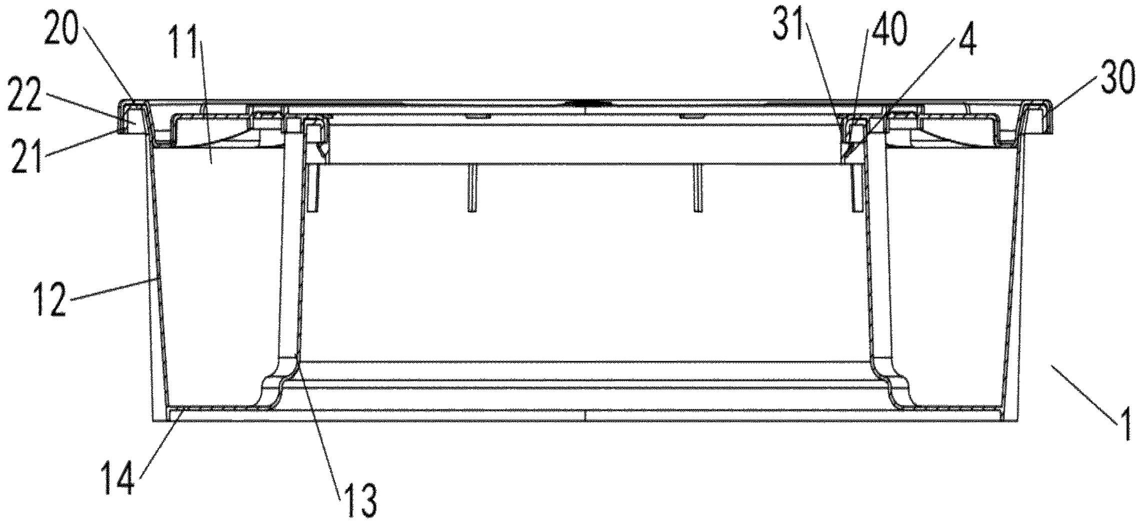
FIG. 4 is a cross-sectional view of the garbage bag storage box of the embodiment shown in FIG. 3.

As shown in FIG. 3 and FIG. 4, this embodiment discloses a garbage bag storage box, including an annular container 1, a protruding element 2, and an annular cover. A central opening 10 is defined by the annular container 1. The annular container 1 includes a storage area 11. The protruding element 2 surrounds an outer peripheral surface of the annular container 1. The protruding element 2 radially protrudes outward from the outer peripheral surface of the annular container 1 and has a uniform or even width. The protruding element 2 includes a first protruding edge 20 surrounding the outer peripheral surface of the annular container 1 and a second protruding edge 21 surrounding an outer periphery of the first protruding edge 20. A contour of the central opening 10 has a diameter dimension in a radial plane. The central opening 10 is defined to be circular with the diameter dimension in the radial plane. The annular cover 3 is attached to the storage area 11. The annular cover 3 can protect a garbage bag in the storage area 11 to prevent the garbage bag from being messed up or falling due to improper operation by the user.

As shown in FIG. 4, the first protruding edge 20 of the protruding element is arranged perpendicular to the second protruding edge 21 of the protruding element.

Figure 5:
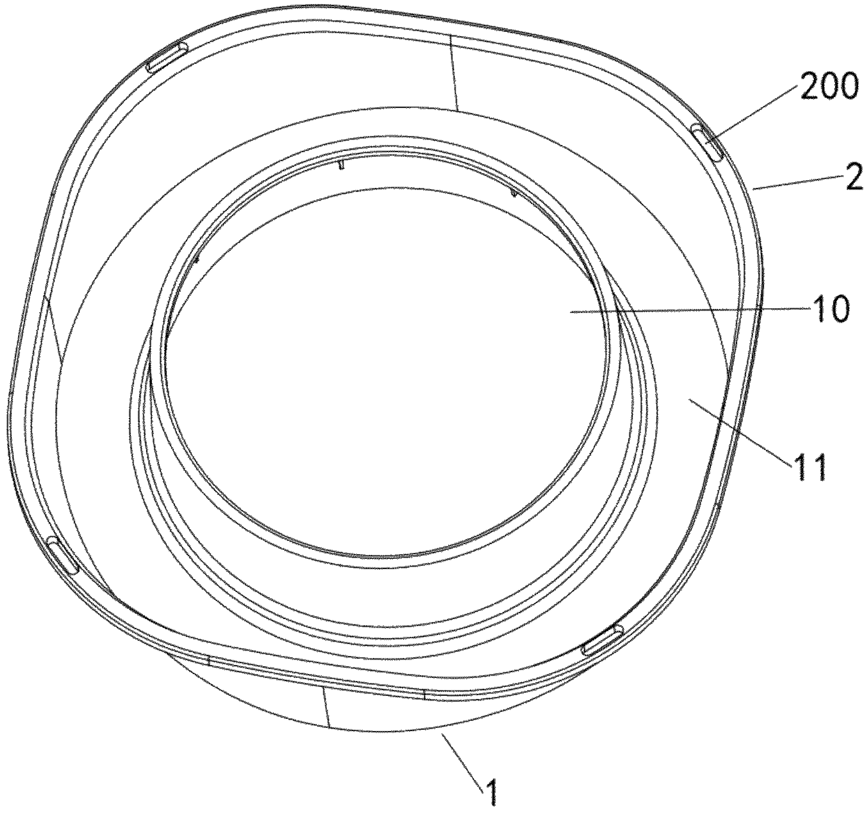
FIG. 5 is a schematic diagram of an annular container in the embodiment shown in FIG. 3.

As shown in FIG. 5, four holes 200 are provided at intervals on the first protruding edge 20.

As shown in FIG. 4, a reinforcing plate 22 is arranged between the first protruding edge 20 and the second protruding edge 21.

As shown in FIG. 4, the annular container 1 includes an outer wall 12, an inner wall 13, and a bottom wall 14 connected between the outer wall 12 and the inner wall 13, and the storage area 11 is located between the outer wall 12 and the inner wall 13.

As shown in FIG. 5, the central opening 10 is defined by an inner surface of the inner wall 13.

As shown in FIG. 4, the bottom wall 14 is of a planar shape.

As shown in FIG. 4, the annular cover 3 includes an outer edge 30 at an outer periphery thereof and an inner edge 31 at an inner periphery thereof, the outer edge 30 extends outward and is configured to engage with the protruding element 2, the inner edge 31 extends downward and is configured to engage with an upper portion of the inner wall 13 of the annular container 1, a locking portion 4 is arranged on a side of the inner edge 31 opposite to the inner wall 13, and the locking portion 4 is configured to lock the annular cover 3 in the storage area 11.

As shown in FIG. 4, the locking portion 4 includes a protrusion 40 attached to the side of the inner edge 31 opposite to the inner wall 13, and the protrusion 40 is configured to snap-fit to the upper portion of the inner wall 13 of the annular container 1 to lock the annular cover 3 in the storage area 11.

Figure 6:
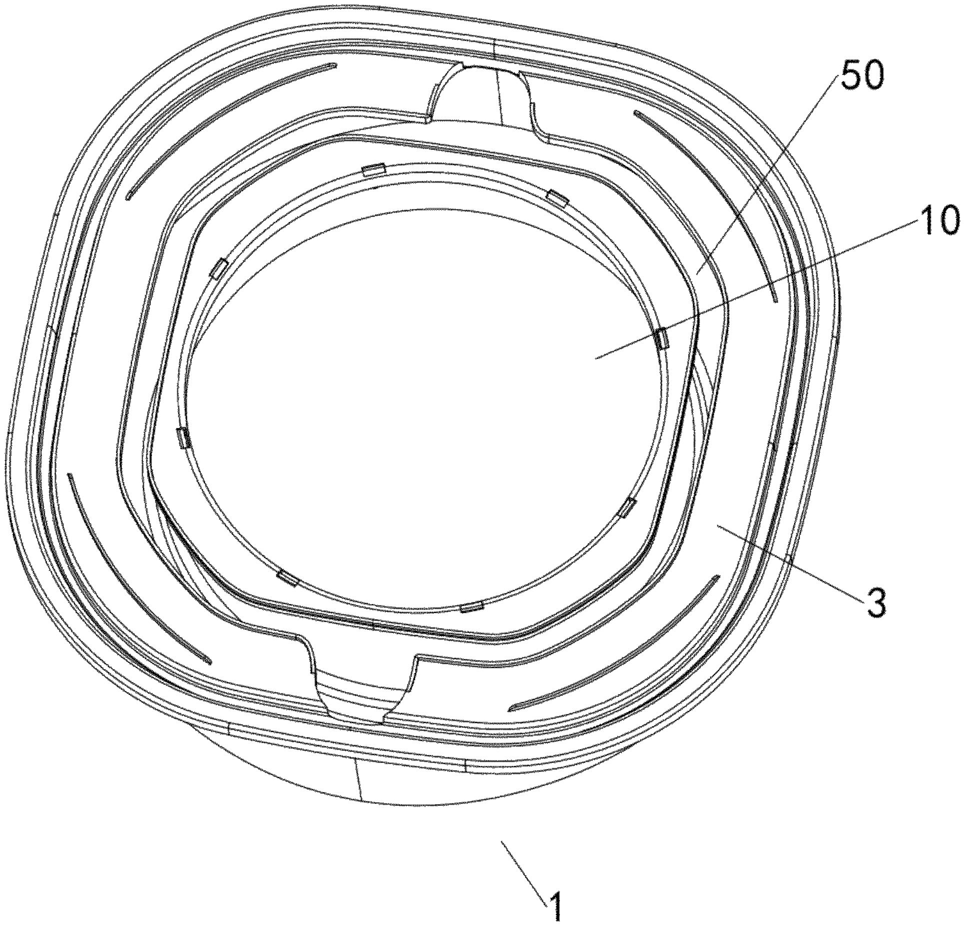
FIG. 6 is a schematic diagram of the garbage bag storage box of the embodiment shown in FIG. 3 after tearable portions are torn off.

As shown in FIG. 3 and FIG. 6, the annular cover 3 includes two tearable portions 5, and after the two tearable portions 5 are torn off, a gap 50 is left on the annular cover 3 to allow the garbage bag to pass through. The configuration of the two tearable portions 5 makes it easier to completely tear off the tearable portions 5, without causing the tearable portions 5 to break or tear sideways.

As shown in FIG. 3, the two tearable portions 5 respectively include protruding blocks 51 extending outward, and grooves 52 respectively configured to receive the protruding blocks 51 are provided on the annular cover 3. The protruding blocks 51 can provide a point of force for the user to easily tear off the two tearable portions 5.

Preferred embodiments of the present disclosure have been described in detail above in conjunction with the accompanying drawings, but the present disclosure is not limited to the specific details in the above embodiments. Various equivalent modifications can be made to the technical solutions of the present disclosure without departing from the scope of the technical concept of the present disclosure. Such equivalent modifications shall all fall within the protection scope of the present disclosure.

What is claimed is:

1. A garbage bag storage box, comprising an annular container and a protruding element, wherein a central opening is defined by the annular container, the annular container comprises a storage area, the protruding element surrounds an outer peripheral surface of the annular container, and the protruding element radially protrudes outward from the outer peripheral surface of the annular container and has a uniform or even width;

the protruding element comprises a first protruding edge surrounding the outer peripheral surface of the annular container and a second protruding edge surrounding an outer periphery of the first protruding edge, wherein the first protruding edge is arranged perpendicular to the second protruding edge; and a contour of the central opening has a diameter dimension in a radial plane, and the central opening is defined to be circular with the diameter dimension in the radial plane.

2. The garbage bag storage box according to claim 1, wherein at least two holes are provided at intervals on the first protruding edge.

3. The garbage bag storage box according to claim 1, wherein a reinforcing plate is arranged between the first protruding edge and the second protruding edge.

4. The garbage bag storage box according to claim 1, wherein the annular container comprises an outer wall, an inner wall, and a bottom wall connected between the outer wall and the inner wall, and the storage area is located between the outer wall and the inner wall.

5. The garbage bag storage box according to claim 4, wherein the central opening is defined by an inner surface of the inner wall.

6. The garbage bag storage box according to claim 4, wherein the bottom wall is of a planar shape.

7. The garbage bag storage box according to claim 1, further comprising an annular cover attached to the storage area.

8. The garbage bag storage box according to claim 7, wherein the annular cover comprises an outer edge at an outer periphery of the annular cover, and the outer edge extends outward and is configured to engage with the protruding element.

9. The garbage bag storage box according to claim 7, wherein the annular cover comprises an inner edge at an inner periphery of the annular cover, and the inner edge extends downward and is configured to engage with an upper portion of an inner wall of the annular container; and a locking portion is arranged on a side of the inner edge opposite to the inner wall, and the locking portion is configured to lock the annular cover in the storage area.

10. The garbage bag storage box according to claim 7, wherein the annular cover comprises at least two tearable portions, and after the at least two tearable portions are torn off, a gap is left on the annular cover.

* * * * *